US011510271B2

(12) United States Patent
Son et al.

(10) Patent No.: US 11,510,271 B2
(45) Date of Patent: Nov. 22, 2022

(54) METHOD AND APPARATUS FOR MANAGING PDU SESSION CONNECTION

(71) Applicant: Samsung Electronics Co., Ltd., Suwon-si (KR)

(72) Inventors: Jungje Son, Suwon-si (KR); Sunghoon Kim, Suwon-si (KR); Kisuk Kweon, Suwon-si (KR); Hoyeon Lee, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 16/539,919

(22) Filed: Aug. 13, 2019

(65) Prior Publication Data
US 2020/0053816 A1 Feb. 13, 2020

(30) Foreign Application Priority Data
Aug. 13, 2018 (KR) .......................... 10-2018-0094562

(51) Int. Cl.
*H04W 76/25* (2018.01)
*H04W 76/30* (2018.01)

(52) U.S. Cl.
CPC .......... *H04W 76/25* (2018.02); *H04W 76/30* (2018.02)

(58) Field of Classification Search
None
See application file for complete search history.

(56) References Cited

U.S. PATENT DOCUMENTS

| 11,388,581 B2 * | 7/2022 | Zhu ........................ H04W 8/26 |
| 2018/0227743 A1 | 8/2018 | Faccin et al. |
| 2019/0037377 A1 * | 1/2019 | Ke .......................... H04W 4/70 |

(Continued)

FOREIGN PATENT DOCUMENTS

| EP | 3435729 A1 | 1/2019 |
| WO | 2017164674 A1 | 9/2017 |

(Continued)

OTHER PUBLICATIONS

European Patent Office "Supplementary European Search Report" dated Jul. 19, 2021, in connection with counterpart European Patent Application No. 19849824.8, 11 pages.
Interdigital Inc., "Update to Solution#19: UP deactivation for UE in RRC inactive state", SA WG2 Meeting #128, SA WG2 Temporary Document, S2-186953, Jul. 2-Jul. 6, 2018, Vilnius, Lithuania, 10 pages.

(Continued)

*Primary Examiner* — Mariela Vidal Carpio

(57) ABSTRACT

The present disclosure relates to a communication method and system for converging a 5th-generation (5G) communication system for supporting higher data rates beyond a 4th-generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method of a SMF entity in a wireless communication system. The method comprises identifying whether to deactivate an UP connection of a first PDU session of one or more established PDU sessions, identifying whether the first PDU session supports an UP optimization based on the identification, and transmitting, to an AMF entity, a first message for deactivating the UP connection.

8 Claims, 13 Drawing Sheets

(56) References Cited

U.S. PATENT DOCUMENTS

| | | | |
|---|---|---|---|
| 2019/0104455 A1 | 4/2019 | Park et al. | |
| 2019/0116229 A1* | 4/2019 | Shi | H04W 76/34 |
| 2019/0174573 A1* | 6/2019 | Velev | H04W 80/10 |
| 2019/0191467 A1* | 6/2019 | Dao | H04W 8/186 |
| 2019/0223152 A1 | 7/2019 | Ke et al. | |
| 2019/0313468 A1* | 10/2019 | Talebi Fard | H04W 76/12 |
| 2019/0364541 A1 | 11/2019 | Ryu | |
| 2020/0015311 A1* | 1/2020 | Kim | H04W 68/005 |
| 2020/0037386 A1* | 1/2020 | Park | H04W 76/25 |
| 2020/0053816 A1* | 2/2020 | Son | H04W 76/30 |
| 2021/0168704 A1* | 6/2021 | Kawasaki | H04W 36/14 |
| 2022/0086703 A1* | 3/2022 | Lee | H04W 36/0022 |

FOREIGN PATENT DOCUMENTS

| | | |
|---|---|---|
| WO | 2017196161 A1 | 11/2017 |
| WO | 2018008980 A1 | 1/2018 |

OTHER PUBLICATIONS

ISA/KR, International Search Report and Written Opinion of the International Searching Authority, International Application No. PCT/KR2019/010335, dated Nov. 21, 2019, 11 pages.

3GPP TS 23.502 V15.2.0 (Jun. 2018), Technical Specification, 3rd Generation Partnership Project; Technical Specification Group Services and System Aspects; Procedures for the 5G System; Stage 2 (Release 15), Jun. 2018, 308 pages.

3GPP TR 23.724 V0.5.0 (Jul. 2018), 3rd Generation Partnership Project; Technical Specification Group Services and System Aspects; Study on Cellular IoT support and evolution for the 5G System (Release 16), Jul. 2018, 218 pages.

3GPP TR 23.724 V16.0.0 (Dec. 2018), 3rd Generation Partnership Project; Technical Specification Group Services and System Aspects; Study on Cellular Internet of Things (IoT) support and evolution for the 5G System (Release 16), Dec. 2018, 277 pages.

* cited by examiner

METHOD AND APPARATUS FOR MANAGING PDU SESSION CONNECTION

CROSS-REFERENCE TO RELATED APPLICATION

This application is based on and claims priority under 35 U.S.C. § 119 to Korean Patent Application No. 10-2018-0094562 filed on Aug. 13, 2018 in the Korean Intellectual Property Office, the disclosure of which is herein incorporated by reference in its entirety.

BACKGROUND

1. Field

The disclosure relates to a method and an apparatus for managing a PDU session connection in a mobile communication system.

2. Description of Related Art

The above information is presented as background information only to assist with an understanding of the disclosure. No determination has been made, and no assertion is made, as to whether any of the above might be applicable as a prior art with regard to the disclosure.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

SUMMARY

The disclosure relates to a method and an apparatus for managing a PDU session state of a UE in a mobile communication system with the mobile communication UE to minimize signaling for activation of a PDU session between the mobile communication UE and the system when the mobile communication UE transmits traffic for a service such as IoT.

In accordance with an aspect of the disclosure, a method by a session management function (SMF) entity in a wireless communication system is provided. The method includes: identifying whether to deactivate user plane (UP) connection of a first PDU session of one or more established PDU sessions; identifying whether the first PDU session supports UP optimization based on the identification; and transmitting a first message (N2 resource release) for deactivating the UP connection of the first PDU session to an access and mobility management function (AMF) entity, wherein if it is identified that the first PDU session supports the UP optimization, the first message includes an indication of the UP optimization.

The first message may be transferred to an base station through the AMF entity, the base station may store context information (AS context) associated with the first PDU session if the message includes the indication of the UP optimization, and the context information may be used to support the UP optimization of the first PDU session.

The method by the SMF entity may further include, if it is determined that the first PDU session supports the UP optimization, performing a session modification procedure for deactivating a downlink UP connection in UP connections of the first PDU session and keeping an uplink UP connection with a user plane function (UPF) entity.

In accordance with another aspect of the disclosure, a method by a user plane function (UPF) entity in a wireless communication system is provided. The method includes: receiving a request message for deactivating a UP connection of a first PDU session of one or more established PDU sessions from an base station; and performing an operation for deactivating the UP connection of the first PDU session based on the request message, wherein the performing of the operation includes, if the first PDU session supports UP optimization, performing an operation for deactivating a downlink connection to the base station in UP connections of the first PDU session and keeping an uplink connection.

In accordance with another aspect of the disclosure, a method by an base station in a wireless communication system is provided. The method includes: receiving a first message (N2 resource release) for deactivating a UP connection of a first PDU session of one or more established PDU sessions from a session management function (SMF) entity through an access and mobility management function (AMF) entity; performing an operation for (releasing radio resources) deactivating a connection to a UE associated with the first PDU session based on the first message; identifying whether the first message includes an indication of user plane (UP) optimization; and storing first context information (AS context) associated with the first PDU session based on the identification, wherein the first context information is used to support UP optimization of the first PDU session.

The storing of the first context information may include, if the first message includes the indication of the UP optimization, storing the first context information associated with the first PDU session.

The method by the base station may further include: transmitting a connection suspend request message for suspending connections of one or more established PDU sessions to the AMF entity; receiving a connection suspend response message from the AMF entity in response to the connection suspend request message; suspending the connection to the UE associated with the one or more PDU sessions; storing context information including second context information (AS context) associated with the one or more PDU sessions and the first context; and transmitting a second message including a resume ID associated with the context information to the UE, wherein the resume ID is used to resume the connection.

The method by the base station may further include: receiving a connection resume request message including the resume ID from the UE in an idle mode; performing an operation for activating the connection to the UE and a connection to a UPF entity associated with the first PDU based on the context information; and transmitting uplink data received from the UE to the UPF entity.

In accordance with another aspect of the disclosure, a method by a UE in a wireless communication system is provided. The method includes: receiving a first message for deactivating a connection associated with a first PDU session of one or more established PDU sessions from an base station; and storing first context information (AS context) associated with the first PDU session based on the first message, wherein the first context is used to support UP optimization of the first PDU session.

The method may further include receiving a second message for suspending connections associated with one or more established PDU sessions from the base station, the second message including a resume ID used to resume the connections, the resume ID being associated with context information including the first context information and second context information associated with the one or more PDU sessions; transmitting, in an idle mode, a connection resume request message (RRC resume request) including the resume ID to the base station; and transmitting uplink data to the base station, wherein the base station performs an operation for activating a connection to the UE and a connection to a UPF entity associated with the first PDU based on the context information and transmits uplink data received from the UE to the UPF entity.

In accordance with an aspect of the disclosure, a session management function (SMF) entity in a wireless communication system is provided. The SMF entity includes: a transceiver; and at least one processor coupled to the transceiver, wherein the at least one processor identifies whether to deactivate user plane (UP) connection of a first PDU session of one or more established PDU sessions, if the UP connection of the first PDU session is deactivated, identifies whether the first PDU session supports UP optimization, and transmits a first message (N2 resource release) for deactivating the UP connection of the first PDU session based on the identification to an access and mobility management function (AMF) entity, wherein if it is identified that the first PDU session supports the UP optimization, the first message includes an indication of the UP optimization.

The first message may be transferred to an base station through the AMF entity, the base station may store context information (AS context) associated with the first PDU session if the message includes the indication of the UP optimization, and the context information may be used to support the UP optimization of the first PDU session.

If it is determined that the first PDU session supports the UP optimization, the at least one processor may perform a session modification procedure for deactivating a downlink UP connection in UP connections of the first PDU session and keeping an uplink UP connection with a user plane function (UPF) entity.

In accordance with another aspect of the disclosure, a user plane function (UPF) entity in a wireless communication system is provided. The UPF entity includes: a transceiver; and at least one processor coupled to the transceiver, wherein the at least one processor receives a request message for deactivating a UP connection of a first PDU session of one or more established PDU sessions from an base station, performs an operation for deactivating the UP connection of the first PDU session based on the request message, wherein, if the first PDU session supports UP optimization, the performing of the operation includes performing an operation for deactivating a downlink connection to the base station in UP connections of the first PDU session and keeping an uplink connection.

In accordance with another aspect of the disclosure, an base station in a wireless communication system is provided. The base station includes: a transceiver; and at least one processor coupled to the transceiver, wherein the at least one processor receives a first message (N2 resource release) for deactivating a UP connection of a first PDU session of one or more established PDU sessions from a session management function (SMF) entity through an access and mobility management function (AMF) entity, performs an operation for (releasing radio resources) deactivating a connection to a UE associated with the first PDU session based on the first message, identifies whether the first message includes an indication of user plane (UP) optimization, and stores first context information (AS context) associated with the first PDU session based on the identification, wherein the first context information is used to support UP optimization of the first PDU session.

The storing of the first context information may include, if the first message includes the indication of the UP optimization, storing the first context information associated with the first PDU session.

The at least one processor may transmit a connection suspend request message for suspending connections of one or more established PDU sessions to the AMF entity, receive a connection suspend response message from the AMF entity in response to the connection suspend request message, suspend the connection to the UE associated with the one or more PDU sessions, store context information including second context information (AS context) associated with the one or more PDU sessions and the first context, and transmit a second message including a resume ID associated with the context information to the UE, wherein the resume ID is used to resume the connection.

The at least one processor may receive a connection resume request message including the resume ID from the UE in an idle mode, perform an operation for activating the connection to the UE and a connection to a UPF entity associated with the first PDU based on the context information, and transmit uplink data received from the UE to the UPF entity.

In accordance with another aspect of the disclosure, a UE in a wireless communication system is provided. The UE includes: a transceiver; and at least one processor coupled to the transceiver, wherein the at least one processor receives a first message for deactivating a connection associated with a first PDU session of one or more established PDU sessions from an base station, and stores first context information (AS context) associated with the first PDU session based on the first message, wherein the first context is used to support UP optimization of the first PDU session.

The at least one processor may receive a second message for suspending connections associated with one or more established PDU sessions from the base station, the second message including a resume ID used to resume the connections, the resume ID being associated with context information including the first context information and second context information associated with the one or more PDU sessions, transmit, in an idle mode, a connection resume request message (RRC resume request) including the resume ID to the base station, and transmit uplink data to the base station, wherein the base station performs an operation for activating a connection to the UE and a connection to a UPF entity associated with the first PDU based on the context information and transmits uplink data received from the UE to the UPF entity.

Embodiments of the disclosure provide an apparatus and a method for efficiently reducing signaling between a mobile communication UE and a system if the UE activates a PDU session to transmit traffic for a service such as IoT in a mobile communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
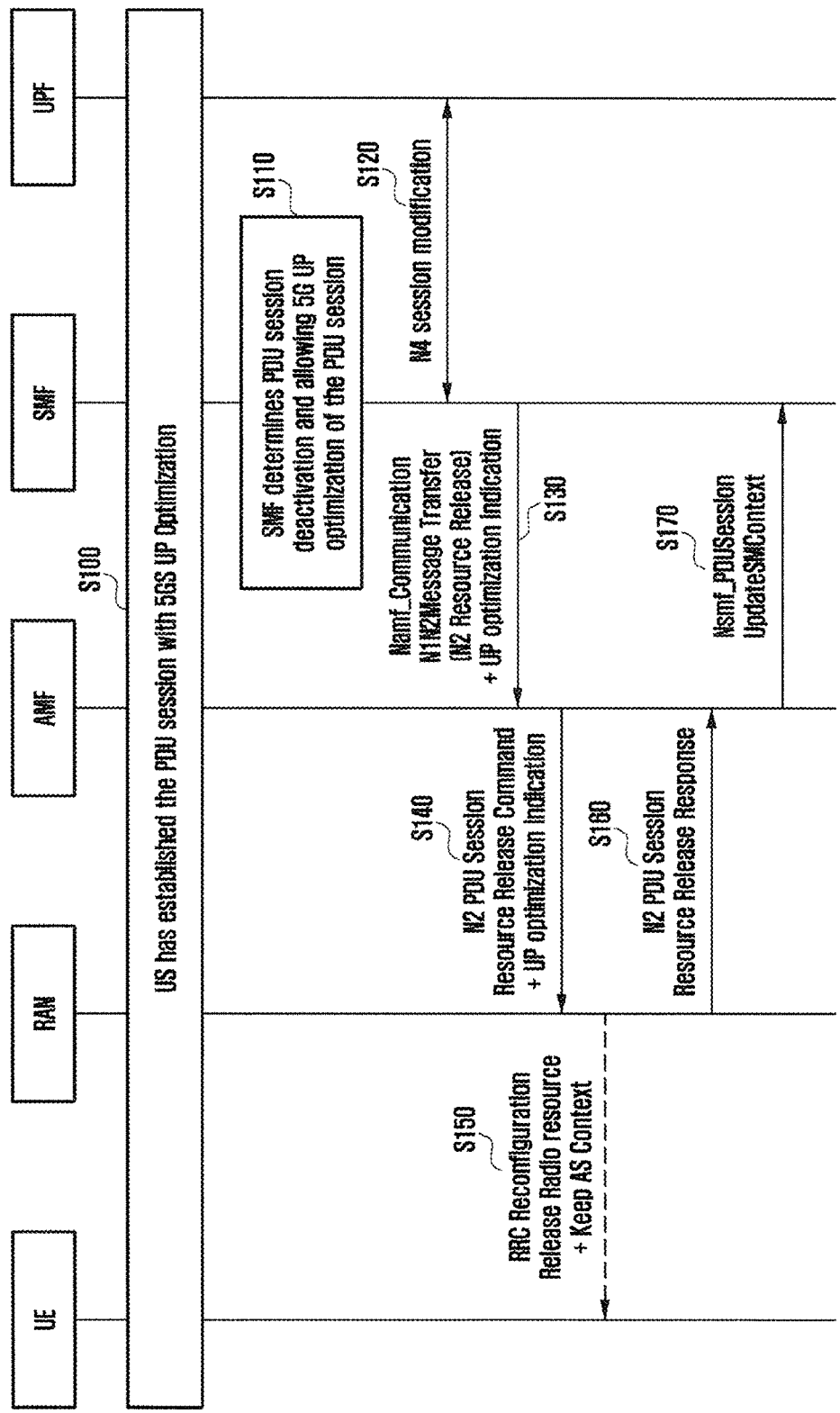
FIG. 1 illustrates a control procedure for deactivating a UP connection of a PDU session according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Hereinafter, a base station is the entity that allocates resources to a UE, and may be one of an eNode B, a gNode B, Node B, a base station (BS), a radio access network (RAN), an access network (AN), The case in which there is no a RAN node, a radio access, a base station controller, and a node on a network. The UE may include a user equipment (UE), a mobile station (MS), a cellular phone, a smart phone, a computer, or a multimedia system capable of performing a communication function. In the disclosure, downlink (DL) refers to a wireless transmission path through which the BS transmits a signal to the UE, and uplink (UL) refers to a wireless transmission path through which the UE transmits a signal to the BS. Also, embodiments of the disclosure may be may be applied to other communication systems through some modifications without departing from the scope of the disclosure on the basis of the identification by those skilled in the art.

Hereinafter, in the state in which one or more PDU sessions supporting user plane (UP) optimization are established, if a UP connection of a specific PDU session is deactivated (released) while the UE is in a connected mode, a procedure (first procedure) for applying (supporting) UP optimization for the specific PDU session is described with reference to FIG. 1 by way of example. Further, a procedure (second procedure) for transitioning the UE from the connected mode to an idle mode in the state in which the UP connection of the specific PUD session is deactivated (released) by the first procedure is described with reference to FIG. 2 by way of example. In addition, a procedure (third procedure) in which the UE entering the idle mode by the second procedure transmits uplink (UL) data is described with reference to FIGS. 3 and 4 by way of example.

In the specification, the first procedure may be referred to as a UP deactivation (release) procedure or a PDU session deactivation procedure, the second procedure may be referred to as a connection suspend procedure, and the third procedure may be referred to as a UL data transmission procedure in the idle mode. In the specification, the UP optimization may be referred to as 5GS UP optimization.

FIG. 1 illustrates a control procedure for deactivating a UP connection of a PDU session according to an embodiment of the disclosure. More specifically, FIG. 1 illustrates a procedure of, if a PDU session supporting UP optimization is configured (established) according to an embodiment of the disclosure, releasing (deactivating) a UP connection for data transmission of the corresponding PDU session to the UE and the BS according to a determination by a session management (SM) network function (hereinafter, referred to as an SMF or an SMF entity). The UP connection of the PDU session includes a first connection (for example, a DRB) between the UE and the BS and/or a second connection (for example, an N3 tunnel) between the BS and the UPF. Meanwhile, in the specification, the release (deactivation) of the UP connection of the PDU session may be referred to as PDU session deactivation.

In the specification, the PDU session supporting UP optimization refers to a PDU session of which an uplink path is preserved (maintained) without being released (deactivated) in the BS and a UP network function (hereinafter, referred to as a UPF or a UPF entity) for uplink data (uplink UP data) transmission in the corresponding PDU session of the UE even when the UE is in the idle state (mode). For example, the PDU session supporting UP optimization refers to a PDU session of which an uplink UP connection is not deactivated in the BS and the UPF for uplink UP data transmission in the corresponding PDU session of the UE even when the UE is in the idle mode (CM-idle mode).

Hereinafter, a procedure of deactivating a UP connection of a PDU session (PDU session deactivation procedure) is described with reference to FIG. 1 by way of example. Meanwhile, in the embodiment of FIG. 1, it is assumed that the UE establishes one or more PDU sessions supporting UP optimization before the PDU session deactivation procedure is performed. In this case, a specific PDU session of the one or more PDU sessions may be selectively deactivated according to a procedure described below while the UE is in the connected mode.

0. The UE establishes one or more PDU sessions having (supporting) UP optimization in S110. At this time, the UE may establish one or more PDU session for UP optimization according to a preset PDU session establishment procedure.

1. The SMF determines whether to allow PDU session deactivation and UP optimization of the PDU session in S120. For example, the SMF may determine whether to deactivate a UP connection of a specific PDU session among the one or more established PDU sessions and, when the UP connection of the specific PDU session is deactivated (released), determine whether the specific PDU session supports UP optimization. For example, the SMF may determine that the UP connection of the specific PDU session among the one or more established PDU sessions needs to be deactivated (released) while the UE is in the connected mode (state), in which case the SMF may determine whether the specific PDU session support UP optimization.

Hereinafter, the determination of whether the SMF deactivates the UP connection of the PDU session (determination to deactivate the PDU session) will be first described, and the determination of whether the PDU session supports (allows) UP optimization (determination to support UP optimization of the PDU session) will then be described.

Determination to Deactivate the PDU Session

If it is expected that there is no data transmission to the UE through the PDU session supporting UP optimization, the SMF may determine to release (deactivate) the UP connection for data transmission of the corresponding PDU session.

At this time, the case (condition) in which it is expected that there is no data transmission to the UE through the PDU session may include at least one of cases (conditions) (1) to (5) below.

In one example of case (1), the case in which there is no data transmission and reception through the PDU session for a predetermined period in the UPF.

In one example of case (2), the case in which the PDU session can be supported (served) only within a predetermined range on the basis of the location of the UE received through an AM network function (hereinafter, referred to as an AMF or an AMF entity) or other network functions (NFs) but the UE is recognized to be out of the service range of the PDU session.

In one example of case (3), the case in which the UE is out of an area in which a data service can be provided in the mobile communication system.

In one example of case (4), the case in which the UE approaches an area in which data transmission and reception are not allowed in the mobile communication system.

In one example of case (5), the case in which the SMF determines that it is temporarily difficult to transmit and receive data through the PDU session.

As described above, if one of the aforementioned cases (conditions) is satisfied, the SMF may determine that there is no data transmission to the UE through the corresponding PDU session and determine to deactivate (release) the UP connection of the corresponding PDU session.

Determination to Allow UP Optimization of the PDU Session

If the SMF determines to release (deactivate) the UP connection of the PDU session, the SMF may determine to differently manage a UP connection of uplink (an uplink UP connection) and a UP connection of downlink (a downlink UP connection) among the UP connections of the PDU session in order to support UP optimization according to situations in which the conditions (cases) occur.

For example, in cases (2), (3), and (4), until it is recognized that the UE moves again to the area in which data transmission through the PDU session is possible, the SMF may determine to release (deactivate) both the downlink and uplink data transmission paths in the UP connections of the PDU session. In another example, in case (1), if the UP connection of the PDU session is released (deactivated), the downlink data transmission path of the PDU session of the UE is deactivated to support UP optimization but it is determined not to release (deactivate) the uplink data transmission of the PDU session. In the specification, releasing (deactivating) the uplink data transmission path in the UP connection may mean releasing (deactivating) the uplink UP connection, and releasing (deactivating) the downlink data transmission path in the UP connection may mean releasing (deactivating) the downlink UP connection.

2. The SMF performs a session modification (N4 session modification) procedure with the UPF to deactivate (release) the UP connection of the PDU session in S120. In the release (deactivation) of the UP connection of the PDU session, the SMF may perform the N4 session modification procedure with the UPF for entire release (deactivation) of releasing (deactivating) both the uplink and downlink data transmission paths connected to the base station associated with the PDU session or partial release (deactivation) of releasing (deactivating) only the downlink data transmission path on the basis of determination about whether to release (deactivate) both the uplink and downlink data transmission paths or to release (deactivate) the downlink data transmission but not release (deactivate) the uplink data transmission path in order to support UP optimization. For example, the SMF may perform the N4 session modification procedure with the UPF to disable both N3 downlink (DL) and uplink (UL) tunnel endpoint IDs (TEIDs) or only the N3 DL TED while keeping the N3 UL TED.

In this case, the UPF may release the data transmission path with the base station for the PDU session according to a request from the SMF. For example, the UPF may disable both the N3 DL and UL TEIDs or only the N3 DL TED while keeping the N3 UL TED according to a request from the SMF.

3. The SMF transmits a message (N2 resource release message) for releasing (deactivating) the UP connection of the PDU session to the AMF through, for example, a Namf_Communication_N1N2_Message Transfer procedure in S130. At this time, the SMF may add an indication of UP optimization (a UP optimization indication) to the N2 resource release message. The SMF may add the UP optimization indication to the N2 resource release message to release only the downlink without releasing the uplink in order to support UP optimization.

4. The AMF transfers the N2 resource release message received from the SMF to the base station belonging to the RAN through, for example, an N2 PDU session command in S140. As described above, the N2 resource release message includes the indication of UP optimization (UP optimization indication).

5. After receiving the N2 resource release message, the base station releases radio resources (AS resources or (R)AN resources) for transmitting and receiving data of the PDU session between the UE and the base station. At this time, if the UP optimization indication is configured (included) in the N2 resource release message, the base station may separately store information (AS context) on radio resources associated with the PDU session without deletion thereof. The AS content may include, for example, configuration information of current radio resources and relevant security information. For example, the AS content may include N2 tunneling, information related to N2AP association UE context and data radio bearer (DRB) context, AS security information, header compression context, and/or random information required for resuming radio resource control (RRC).

The base station may transmit an RRC message (RRC reconfiguration message) including information related to release of radio resources and/or maintenance (storage) of AS context of the UE to the UE in S150.

The connection between the UE and the base station associated with the PDU session may be deactivated (released) by the release of radio resources by the base station for transmitting and receiving data of the PDU session between the UE and the base station.

6. After releasing radio resources, the base station transmits a response (N2 resource release response) to N2 resource release, for example, an N2 PDU session response to the AMF in S160. That is, the base station may acknowledge a request for N2 resource release by transmitting an N2 resource release response to the AMF in response to an N2 resource release command (request).

7. After receiving the response to the N2 resource release (N2 resource release response) received from the base station, the AMF transmits a response to the message received from the SMF in S130 through, for example, a Namf_PDUSession_UpdateSMContext procedure in S170.

According to an embodiment of the disclosure, in S150, the base station may allow the UE to keep (store) AS context information related to radio resource of the PDU session without deletion thereof when the radio resources are released. For example, the base station may transmit configuration information for configuring the UE to keep the AS context to the UE through the RRC message (for example, RRC reconfiguration message), and the UE may keep the AS context on the basis of the RRC message.

As described above, according to the embodiment of FIG. 1, if a UP connection of a specific PDU session supporting UP optimization is deactivated according to a determination by the SMF while the UE is in the connected mode (CM-connected mode), the SMF signals a UP optimization indication to the base station through the AMF in order to support UP optimization for the PDU session. Accordingly, the base station and/or the UE keep (store) AS context related to the PDU session without deletion thereof. Therefore, in the connected mode, AS context related to a first PDU session deactivated according to a determination by the SMF may be used to support UP optimization of the PDU session during a connection suspend procedure and a UL data transmission procedure in the idle mode described below.

Figure 2:
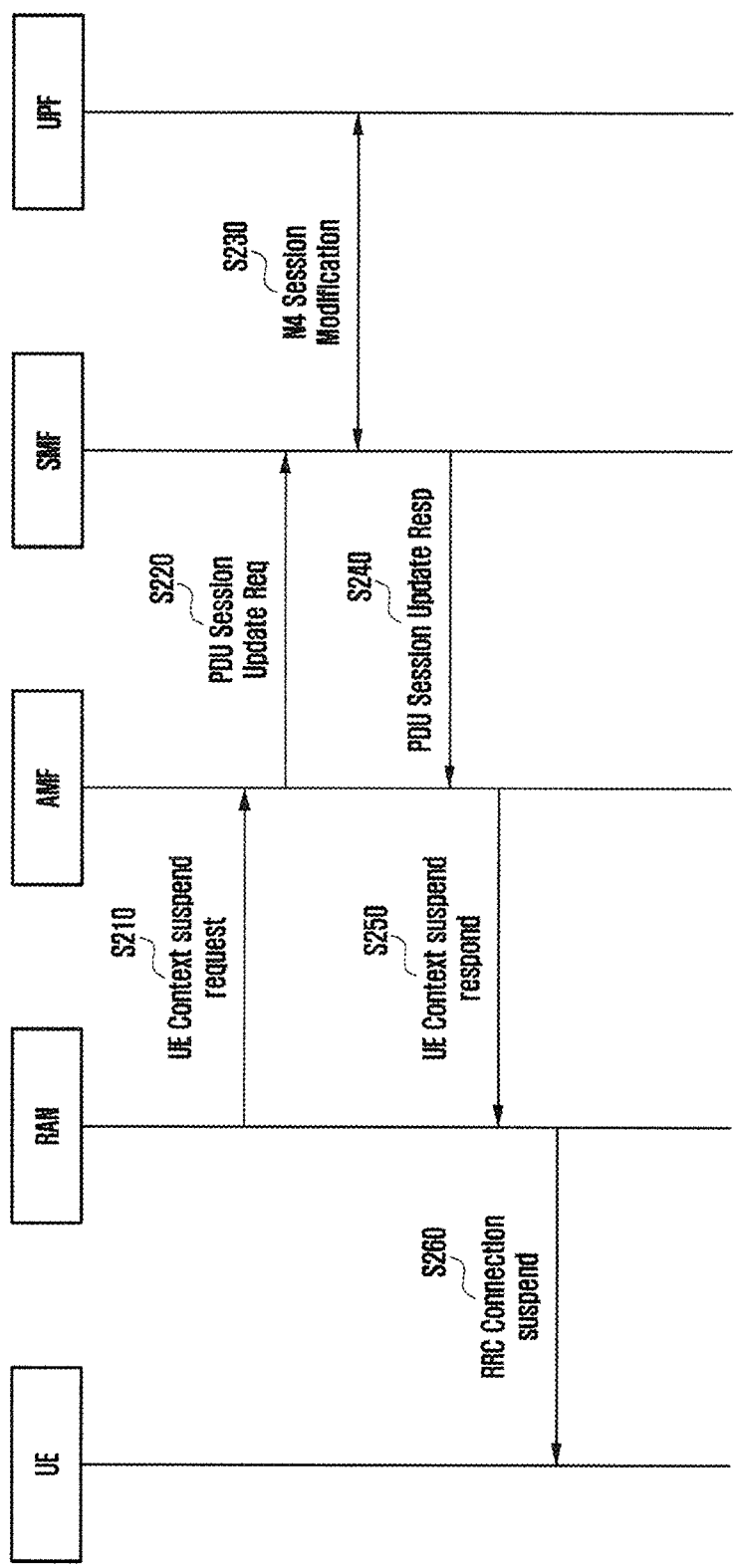
FIG. 2 illustrates a control procedure for transitioning a UE from a connected mode to an idle mode according to an embodiment of the disclosure.

FIG. 2 illustrates a control procedure for transitioning the UE from the connected mode to the idle mode according to an embodiment of the disclosure. In the specification, the control procedure for transitioning the UE to the idle mode in FIG. 2 may be referred to as a connection suspend procedure. The connection suspend procedure may be used (initiated) by the base station (RAN) in order to suspend the connection supporting, for example, UP optimization.

1. The base station transmits a connection suspend request message (UE context suspend request message) for initiating the connection suspend procedure to the AMF in S210. The base station may release (deactivate) radio resources associated with the UE and the UP connection of relevant PDU session(s) by transmitting the UE context suspend request message to the AMF and make a request for transitioning the UE to the idle mode. According to an embodiment, the UE context suspend request message may include IDs of the relevant PDU session(s).

According to an embodiment, the relevant PDU session(s) may include all currently active PDU session(s). For example, the relevant PDU session may include all active PDU session(s) when the connection suspend procedure is initiated. In this case, through the procedure illustrated in the embodiment of FIG. 1, an already deactivated PDU session before the connection suspend procedure is initiated is not included in the relevant PDU session(s).

2. After receiving the connection suspend request message (UE context suspend request message), the AMF transmits a PDU session update request (Nsmf_PDUSession_UpdateSMContext Request) that makes a request for releasing (deactivating) the UP connection of the PDU session to the SMF, which manages PDU sessions(s) of the UE, in S220.

3. If the corresponding PDU session is a PDU session to which UP optimization is applied (or supporting UP optimization) after the PDU session update request is received, the SMF performs a session modification procedure (N4 session modification procedure) with the UFP to release (deactivate) the downlink connection (downlink UP connection) in the UP connections of the corresponding PDU session and not to release (deactivate) the uplink connection (uplink UP connection) in S230. That is, the SMF performs, with the UPF, the N4 session modification procedure for deactivating the UP connection of the PDU session according to whether UP optimization is applied. At this time, if the corresponding PDU session is the PDU session supporting UP optimization, the SMF may perform the N4 session modification procedure with the UPF to release only the downlink UP connection in the UP connections of the corresponding PDU session. For example, the SMF may transmit a request for disabling the N3 DL TEID for the corresponding PDU session and keeping the N3 UL TEID to the UPF, and the UPF may perform an operation according to the request from the SMF.

4. The SMF responds to the PDU session update request received from the AMF. To this end, the SMF transmits a PDU session update response (Nsmf_PDUSession_UpdateSMContext Response) to the AMF in response to the PDU session update request in S240.

5. The AMF transmits a UE context suspend response message to the base station in S250. As described above, the AMF transmits the UE context suspend response message to the base station in response to the UE context suspend request message received from the base station in order to successfully complete the connection suspend procedure.

6. The base station releases radio resources with the UE. At this time, when radio access for data transmission in the idle mode is initiated in the future, the base station indicates the UP optimization connection and allocates a resume ID to the UE to indicate a relevant AS context of the UE. For example, the base station may transmit an RRC connection suspend message including the resume ID to be used for identifying (indicating) AS context during an RRC connection resume (RRC resume) procedure to the UE in S260. Accordingly, the base station may suspend the RRC connection to the UE. Further, the UE may enter the idle mode.

At this time, both the UE and the base station keep (store) AS context associated with the UE without deletion thereof. That is, both the UE and the base station may keep AS context associated with the UE and use the AS context during the RRC resume procedure.

In the embodiment of FIG. 2, when keeping (storing) AS context, the base station may release (deactivate) the UP connection supporting UP optimization of the PDU session associated with the UE as described in the embodiment of FIG. 1 before the UE context suspend procedure (connection suspend procedure) and, if there is a maintained (stored) AS context, also keep (store) the stored AS context, thereby using the same in the connection for uplink data transmission in the idle mode of the UE in the future. To sum up, if the procedure (PDU session deactivation procedure) illustrated in the embodiment of FIG. 1 has been already performed before the procedure (connection suspend procedure) illustrated in the embodiment of FIG. 2 and there is AS context (first AS context) associated with an already stored first PDU session during the PDU session deactivation procedure, the base station may store AS context (second AS context) of the connection suspend procedure along with the first AS context. Accordingly, the base station may keep (store) updated AS context (context information) including both the first AS context (first context information) of the PDU session deactivation procedure and the second AS context (second context information) of the connection suspend procedure.

As described above, in the connection suspend procedure according to the disclosure, the base station stores not only AS context associated with first PDU session(s) deactivated through the connection suspend procedure but also AS context associated with second PDU session(s) deactivated according to a determination by the SMF before the connection suspend procedure, so that UL data can be transmitted through the second PDU session(s) without a service request procedure by the UE when the UE in the idle mode transmits the UL data in the future. On the other hand, in the conventional connection suspend procedure, the base station stores only the AS context associated with first PDU session (s) deactivated through the connection suspend procedure but cannot store the AS context associated with second PDU session(s) deactivated according to a determination by the SMF before the connection suspend procedure, so that UL data cannot be transmitted through the second PDU session (s) without a service request procedure by the UE when the UE in the idle mode transmits the UL data in the future.

Figure 3:
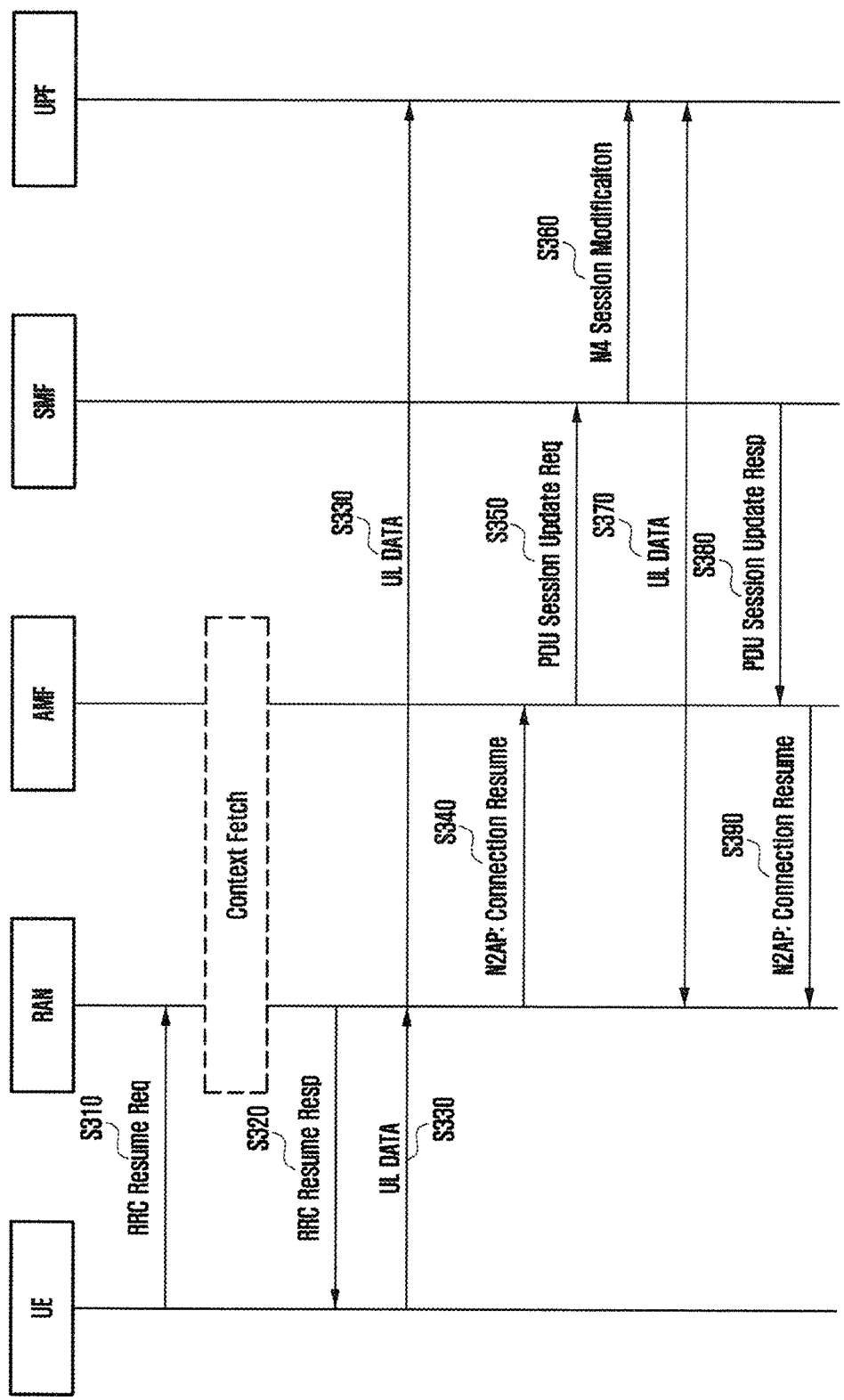
FIG. 3 illustrates a procedure for configuring a UE connection to allow the UE in the idle mode to transmit data to a mobile communication network according to an embodiment of the disclosure.

FIG. 3 illustrates a procedure for configuring a connection of the UE in order to allow the UE in the idle mode to transmit data to a mobile communication network according to an embodiment of the disclosure. The embodiment of FIG. 3 corresponds to a first embodiment of UL data transmission by the UE in the idle mode. For example, the embodiment of FIG. 3 is a UL data transmission procedure by the UE entering the idle mode through the procedure according to the embodiment of FIG. 1 and the procedure according to the embodiment of FIG. 2 and corresponds to an embodiment in which UL data is transmitted after an RRC resume procedure is successfully completed.

1. If uplink data to be transmitted is generated in the UE in the idle state (mode), the UE transmits an RRC resume request message including a saved (stored) resume ID to the base station in S310. At this time, the resume ID refers to (indicates) an AS context of the UE which the base station stores. The resume ID may be used to identify the AS context stored in the base station.

If the base station receives an RRC resume request message including a resume ID from the UE, the base station uses the AS context indicated by the resume ID to re-activate configurations required for radio resources of the UE and the radio connection and activates the uplink data transmission path with the UPF. For example, the base station may perform an AS security check using the AS context identified by the resume ID within the RRC resume request message, establish a data radio bearer (DRB), and enable an N3 UL TED for delivering data. Accordingly, the uplink UP connection of PDU session(s) associated with the AS context may be activated.

At this time, if the base station is not the base station that stores the AS context of the UE, the base station may directly acquire the corresponding AS context from the base station having allocated the resume ID or acquire the AS context from the corresponding base station through the AMF (context fetch procedure).

2. The base station transmits an RRC resume response message indicating that radio resources for uplink data transmission are activated to the UE in S320. If the base station saves (stores) AS context different from AS context saved (stored) in the UE, the base station may transmit again the AS context to the UE in step 320. Upon receiving the AS context, the UE may delete the AS context that the UE conventionally has and reactivate configurations required for radio resources and the radio connection with the base station through the newly received AS context.

3. The UE transmits uplink data through the activated configurations of the radio resources and the radio connection in S330. If the base station receives uplink data from the UE, the base station identifies the UP connection of the PDU session associated with the radio resources through which the data is received and transmits the data to the relevant UPF.

4. The base station transmits a connection resume request message indicating that the UE may transition from the idle state (mode) to the connected state (mode) to the AMF in S440. At this time, the connection resume request message may refer to PDU session(s) used by the UE. For example, the connection resume request message may include IDs of PDU session(s) associated with the UE.

5. The AMF receiving the connection resume request message identifies SMF(s) that manages the PDU session of the UE and transmits a PDU session update request (Nsmf_PDUSession_UpdateSMcontext request) that makes a request for activating the UP connection of the corresponding PDU session to SMF(s) in S450.

6. The SMF receiving the PDU session update request from the AMF performs a session modification procedure (N4 session modification procedure) with the UPF to activate the UP connection in S360.

7. If the UPF receives downlink data to the UE, the UPF may transfer the data to the base station through the activated UP connection in S370. The transferred data is transmitted to the UE through the base station.

8. The SMF performing the N4 session modification procedure with the UPF transmits a response to the PDU session update request (a PDU session update response (Nsmf_PDUSession_UpdateSMcontext response)) to the AMF in S380.

9. After receiving the PDU session update response from the SMF, the AMF transmits a response to the connection resume request (a connection resume response) to the base station in S390.

According to an embodiment, steps S340 to S390 may be omitted according to a determination by the base station such as an expectation that downlink data would not be transmitted due to a data transmission characteristic of the UE. In other words, if the base station expects there would be no DL data on the basis of a preset determination method, steps S340 to S390 may be omitted.

According to another embodiment of the disclosure, if downlink data is received from UPF(s) associated with the PDU session of the UE while the UE is in the idle state (mode), the SMF that manages the PDU session may inform the AMF of the reception of the downlink data, and the AMF may transmit paging to the UE. If the UE receives paging, the UE may transmit an RRC resume request including a resume ID to the base station through the procedure according to the embodiment of FIG. 3 or a procedure according to an embodiment of FIG. 4 described below, and the base station, the AMF, and SMFs receiving the RRC resume request may transition the UE to the connected state (mode) through the procedures according to the embodiment of FIG. 3 or 4 and activate the UP connection between the UE and the base station and between the base station and UP functions(s).

Figure 4:
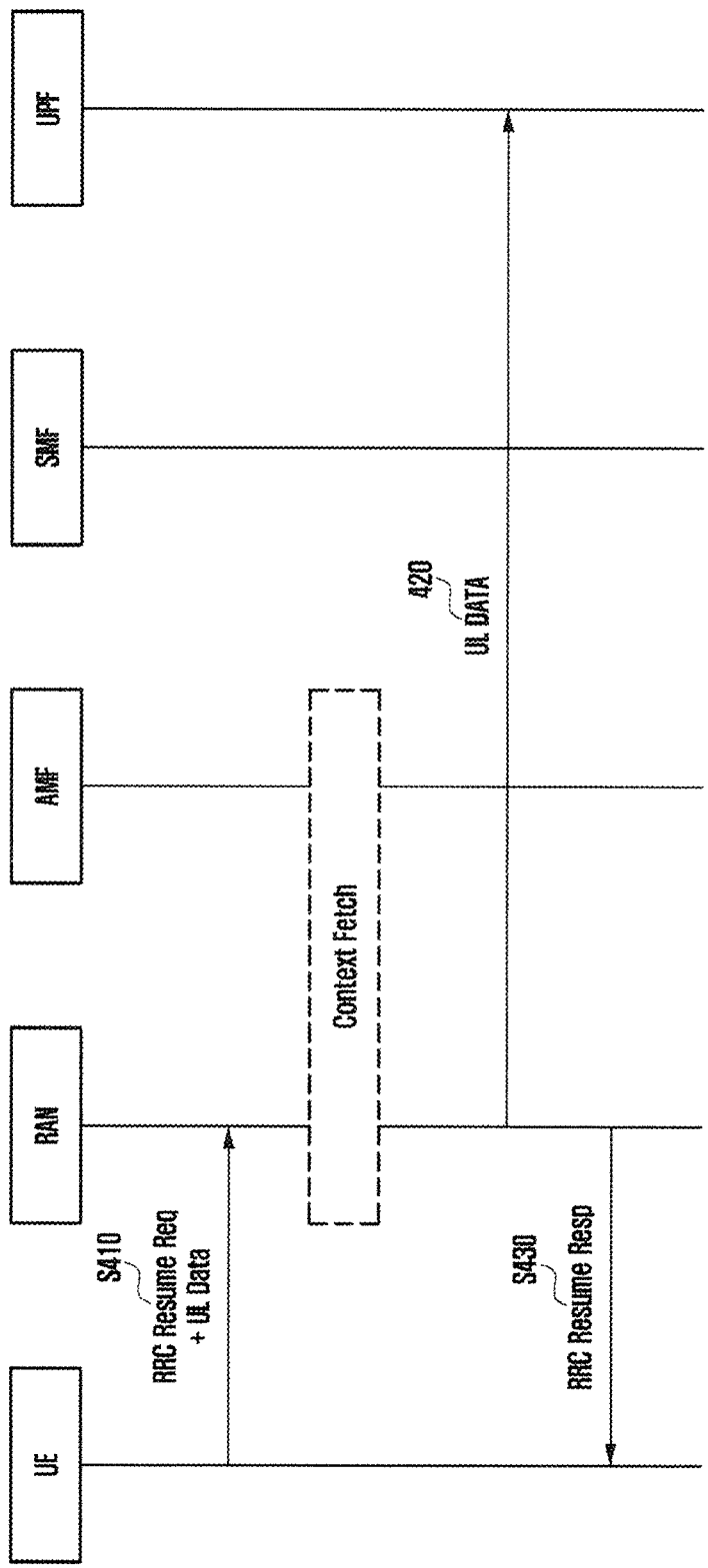
FIG. 4 illustrates a procedure for configuring a UE connection and transmitting uplink data to allow the UE in the idle mode to transmit data to a mobile communication network according to an embodiment of the disclosure.

FIG. 4 illustrates a procedure for transmitting uplink data simultaneously with configuring the connection of the UE to allow the UE in the idle mode to transmit data to a mobile communication network according to an embodiment of the disclosure. The embodiment of FIG. 4 corresponds to a second embodiment of UL data transmission by the UE in the idle mode. For example, the embodiment of FIG. 4 is a UL data transmission procedure by the UE entering the idle mode through the procedure according to the embodiment of FIG. 1 and the procedure according to the embodiment of FIG. 2 and corresponds to an embodiment in which UL data is transmitted along with the RRC resume request.

1. If uplink data to be transmitted is generated in the UE in the idle state (mode), the UE transmits uplink data along with an RRC resume request message including a saved (stored) resume ID to the base station in S410. In this case, the UE may further transmit an ID of the PDU session to which the corresponding uplink data is connected (PDU session ID) and/or a radio connection identifier such as a radio bearer ID indicating a radio connection associated therewith to the base station. At this time, the resume ID refers to (indicates) an AS context of the UE which the base station stores. The resume ID may be used to identify the AS context stored in the base station.

If the base station receives an RRC resume request message including a resume ID from the UE, the base station uses the AS context indicated by the resume ID to re-activate radio resources of the UE and configurations required for the radio connection and activates the uplink data transmission path with the UPF. For example, the base station may perform an AS security check using the AS context identified by the resume ID within the RRC resume request message, establish a data radio bearer (DRB), and enable an N3 UL TED for delivering data. Accordingly, the uplink UP connection of PDU session(s) associated with the AS context may be activated.

At this time, if the base station is not the base station that stores the AS context of the UE, the base station may directly acquire the corresponding AS context from the base station having allocated the resume ID or acquire the AS context from the corresponding base station through the AMF (context fetch procedure).

If the base station receives uplink data and the PDU session ID and/or the radio connection identifier associated with the uplink data from the UE, the base station identifies a PDU session associated with the uplink data through the PDU session ID and/or the radio connection identifier and identifies a UPF that manages a UP connection of the corresponding PDU session in S410.

2. The base station transfers the uplink data received through the identified UP connection to the identified UPF in S420. As described above, according to the embodiment of FIG. 4, the UL data may be transmitted to the UPF before the RRC resume procedure is successfully completed. Accordingly, the UL data can be transmitted more rapidly compared to the embodiment of FIG. 3.

3. The base station transmits an RRC resume response (RRC resume response message) indicating that radio resources for uplink data transmission are activated to the UE in S430.

The base station may indicate transition of the UE to the idle mode through the RRC resume response according to a determination by the UE such as an expectation that the UE would have no uplink data to additionally transmit or no downlink data to receive. In other words, if the base station expects that the UE would have no uplink data to additionally transmit or no downlink data to receive through a preset determination method, the base station may provide an indication indicating re-entry into the idle mode to the UE through the RRC resume response message.

Figure 5:
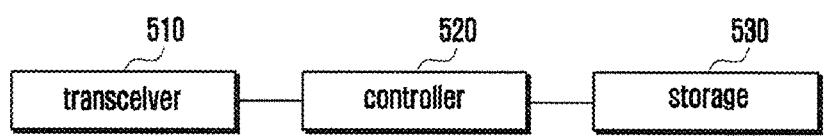
FIG. 5 illustrates a UE according to an embodiment of the disclosure.

FIG. 5 illustrates a UE according to an embodiment of the disclosure.

According to an embodiment, the UE may include a transceiver 510, a controller 520, and a storage 530. In the disclosure, the controller 520 may be defined as a circuit, an application-specific integrated circuit, or at least one processor.

The transceiver 510 may transmit/receive a signal to/from another network entity. For example, the transceiver 510 may receive a synchronization signal or a reference signal from the base station.

The controller 520 may control the overall operation of the UE according to an embodiment of the present disclosure. For example, the controller 520 may control the signal flow to perform the operation according to the procedures of FIGS. 1 to 4 described above.

According to an embodiment, if it is determined that uplink data transmission is needed, the controller 520 may control the transceiver 510 to transmit an RRC resume request message including a saved (stored) resume ID to the base station and control the transceiver 510 to receive an RRC resume response indicating that radio resources for transmitting uplink data are activated from the base station in response to the RRC resume request message.

According to an embodiment, the controller 520 may receive a first message (N2 resource release) for deactivating the connection associated with a first PDU session among one or more established PDU sessions from the base station and store first context information (AS context) associated with the first PDU session on the basis of the first message. At this time, the first context may be used to support UP optimization of the first PDU session.

According to an embodiment, the controller 520 may receive a second message (RRC connection suspend) for suspending the connection associated with one or more established PDU sessions from the base station. At this time, the second message may include a resume ID used to resume the connection, and the resume ID may be associated with context information including the first context information and second context information associated with the one or more PDU sessions.

According to an embodiment, in the idle mode, the controller 520 may transmit a connection resume request message including the resume ID to the base station.

According to an embodiment, the controller 520 may transmit uplink data to the base station. Transmission of the uplink data may be performed before or after an RRC resume response message is received from the base station in response to the connection resume request message.

The storage 530 may store at least one piece of information transmitted and received through the transceiver 510 and information generated through the controller 520. For example, the storage 530 may store the resume ID received from the base station. Further, the storage 530 may store context information (AS context) associated with PDU session(s).

Figure 6:
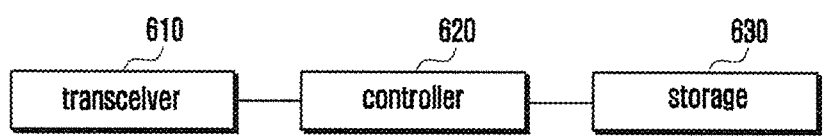
FIG. 6 illustrates an base station according to an embodiment of the disclosure.

FIG. 6 illustrates an base station according to an embodiment of the disclosure.

According to an embodiment, the base station may include a transceiver 610, a controller 620, and a storage 630. In the disclosure, the controller 620 may be defined as a circuit, an application-specific integrated circuit, or at least one processor.

The transceiver 610 may transmit/receive a signal to/from another network entity. The controller 620 may control the overall operation of the base station according to an embodiment of the present disclosure. For example, the controller 620 may control the signal flow to perform the operation according to the procedures of FIGS. 1 to 4 described above.

According to an embodiment, the controller 620 may control the transceiver 610 to transmit a UE context suspend request message to the AMF and control the transceiver 610 to receive a UE context suspend response message from the AMF in response to the UE context suspend request message.

According to an embodiment, the controller 620 may receive a first message (N2 resource release) for deactivating a UP connection of a first PDU session among one or more established PDU sessions from an SMF entity through an AMF entity, perform an operation (releasing radio resources) for deactivating the connection to the UE associated with the first PDU session on the basis of the first message, determine whether the first message includes an indication of user plane (UP) optimization, and store first content information (AS context) associated with the first PDU session on the basis of the determination. At this time, the first context information may be used to support UP optimization of the first PDU session.

According to an embodiment, if the first message includes the indication of the UP optimization, the controller 620 may determine to store the first content information associated with the first PDU session.

According to an embodiment, the controller 620 may transmit a connection suspend request message for suspending the connection of one or more established PDU sessions to the AMF entity, receive a connection suspend response message from the AMF entity in response to the connection suspend request message, suspend the connection to the UE associated with the one or more PDU sessions, store content information including second context information (AS context) associated with the one or more PDU sessions and the first context information, and transmit a message including a resume ID associated with the context information to the UE. At this time, the resume ID may be used to resume the connection.

According to an embodiment, the controller 620 may include a step of receiving a connection resume request message including the resume ID from the UE in the idle mode, performing an operation for activating the connection to the UE and the connection to the UPF entity associated with the first PDU on the basis of the context information, and transmitting uplink data received from the UE to the UPF entity.

The storage 630 may store at least one piece of information transmitted and received through the transceiver 610 and information generated through the controller 620. For example, the storage 630 may store AS context related to the UE. Further, the storage 630 may store context information (AS context) associated with PDU session(s).

Figure 7:
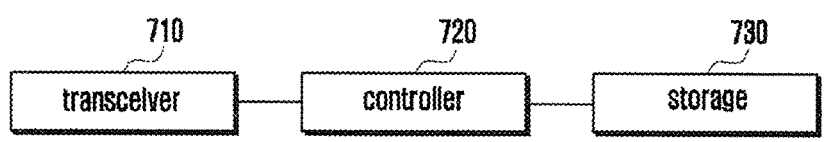
FIG. 7 illustrates an access and mobility management function (AMF) according to an embodiment of the disclosure.

FIG. 7 illustrates an access and mobility management function (AMF) according to an embodiment.

According to an embodiment, the AMF may include a transceiver 710, a controller 720, and a storage 730. In the disclosure, the controller 720 may be defined as a circuit, an application-specific integrated circuit, or at least one processor.

The transceiver 710 may transmit/receive a signal to/from another network entity. The controller 720 may control the overall operation of the AMF according to an embodiment of the present disclosure. For example, the controller 720 may control the signal flow to perform the operation according to the procedures of FIGS. 1 to 4 described above.

According to an embodiment, after receiving a connection suspend message from the base station through the transceiver 710, the controller 720 may control the transceiver 710 to transmit a PDU session update request that makes a request for releasing the user plane connection of the PDU session to the SMF that manages the PDU session of the UE.

Further, the controller 720 may control the transceiver 710 to receive a response to the PDU session update request from the SMF.

The storage 730 may store at least one piece of information transmitted and received through the transceiver 710 and information generated through the controller 720.

Figure 8:
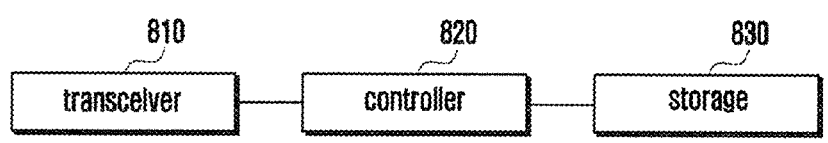
FIG. 8 illustrates an a session management function (SMF) according to an embodiment of the disclosure.

FIG. 8 illustrates an a session management function (SMF) according to an embodiment.

According to an embodiment, the SMF may include a transceiver 810, a controller 820, and a storage 830. In the disclosure, the controller 820 may be defined as a circuit, an application-specific integrated circuit, or at least one processor.

The transceiver 810 may transmit/receive a signal to/from another network entity. The controller 820 may control the overall operation of the SMF according to an embodiment of the present disclosure. For example, the controller 820 may control the signal flow to perform the operation according to the procedures of FIGS. 1 to 4 described above.

According to an embodiment, if the corresponding PDU session is a PDU session to which UP optimization is applied after the PDU session update request is received from the AMF through the transceiver 810, the controller 820 may perform an N4 session modification procedure with the UPF to release a downlink connection in the user plane connection of the corresponding PDU session and not to release an uplink connection.

According to an embodiment, the controller 820 may identify whether to deactivate a user plane (UP) connection of a first PDU session among one or more established PDU sessions, determine whether the first PDU session supports UP optimization based on the identification, and transmit a first message (N2 Resource Release) for deactivating the UP connection of the first PDU session based on the determination to the AMF entity. At this time, if the first PDU session supports the UP optimization, the first message may include an indication of the UP optimization.

According to an embodiment, if the first PDU session supports the UP optimization, the controller 820 may perform a session modification procedure with the user plane function (UPF) entity to deactivate a downlink UP connection in the UP connections of the first PDU session and keep an uplink UP connection.

The storage 830 may store at least one piece of information transmitted and received through the transceiver 810 and information generated through the controller 820.

Figure 9:
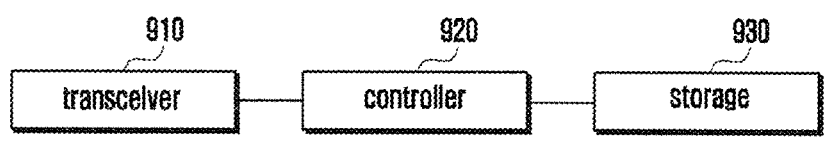
FIG. 9 illustrates a user plane function (UPF) according to an embodiment of the disclosure.

FIG. 9 illustrates a user plane function (UPF) according to an embodiment of the disclosure.

According to an embodiment, the UPF may include a transceiver 910, a controller 920, and a storage 930. In the disclosure, the controller 920 may be defined as a circuit, an application-specific integrated circuit, or at least one processor.

The transceiver 910 may transmit/receive a signal to/from another network entity. The controller 920 may control the overall operation of the UPF according to an embodiment of the present disclosure. For example, the controller 920 may control the signal flow to perform the operation according to the procedures of FIGS. 1 to 4 described above.

According to an embodiment, if the PDU session is a PDU session to which UP optimization is applied, the controller 920 may perform an N4 session modification procedure with the SMF to release a downlink connection in the user plane connection of the corresponding PDU session and not to release an uplink connection.

According to an embodiment, the controller 920 may receive a session modification request message for deactivating the UP connection of the first PDU session among one or more established PDU sessions from the base station and perform an operation for deactivating the UP connection of the first PDU session on the basis of the session modification request message. According to an embodiment, if the first PDU session supports UP optimization, the controller 920 may perform an operation for deactivating a downlink connection to the base station in the UP connections of the first PDU session and keeping an uplink connection.

The storage 930 may store at least one piece of information transmitted and received through the transceiver 910 and information generated through the controller 920.

Figure 10:
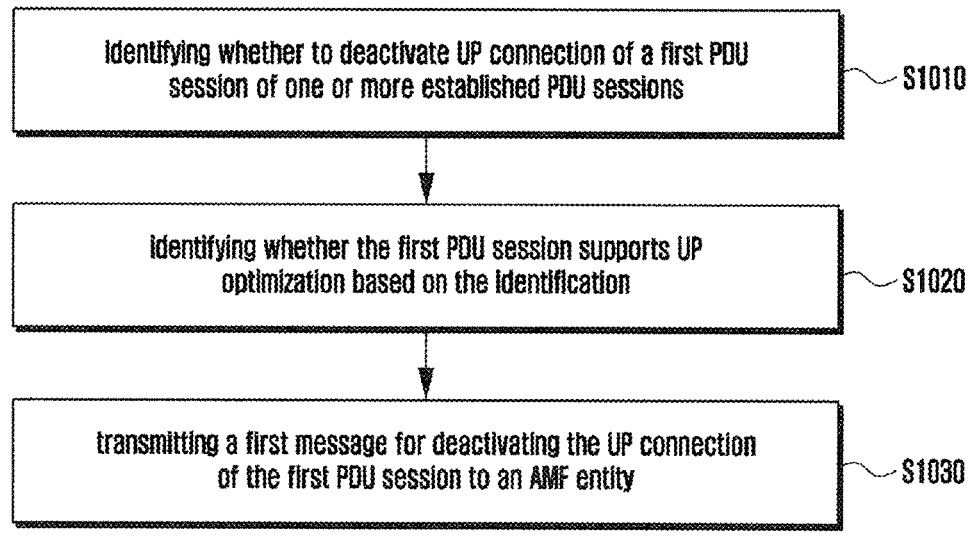
FIG. 10 illustrates a flow chart of a method for a SMF entity according to an embodiment of the disclosure.

FIG. 10. illustrates a flow chart for a method of a SMF entity according to an embodiment of the disclosure. In FIG. 10, detailed descriptions of the contents described above with reference to FIGS. 1 to 9 will be omitted. For example, a substantially same operations/procedures as described above in S110 may be applied for this.

Referring to FIG. 10, the SMF entity (SMF) identifies whether to deactivate a user plane (UP) connection of a first PDU session of one or more established PDU sessions (S1010). For example, a substantially same operations/ procedures as described above in S110 may be applied for this.

The SMF entity identifies whether the first PDU session supports UP optimization based on the identification (S1020). For example, the SMF entity identifies identifies whether the first PDU session supports UP optimization, in case that the UP connection of a first PDU session is deactivated. For example, a substantially same operations/ procedures as described above in S110 may be applied for this.

The SMF entity transmits a first message (N2 Resource Release) for deactivating the UP connection of the first PDU session based on the identification to the AMF entity (S1030). For example, a substantially same operations/ procedures as described above in S130 may be applied for this.

According to an embodiment, in case that it is determined that the first PDU session supports the UP optimization, the first message may include an indication of the UP optimization.

According to an embodiment, the first message is transferred to an base station through the AMF entity, the base station stores context information (AS context) associated with the first PDU session in case that the first message includes the indication of the UP optimization, and the context information is used to support the UP optimization of the first PDU session. For example, a substantially same operations/procedures as described above in S140 may be applied for this.

According to an embodiment, in case that it is identified that the first PDU session supports the UP optimization, the SMF entity may perform a session modification procedure with the user plane function (UPF) entity to deactivate a downlink UP connection in the UP connections of the first PDU sSession and keep an uplink UP connection. For example, a substantially same operations/procedures as described above in S120 may be applied for this.

Figure 11:
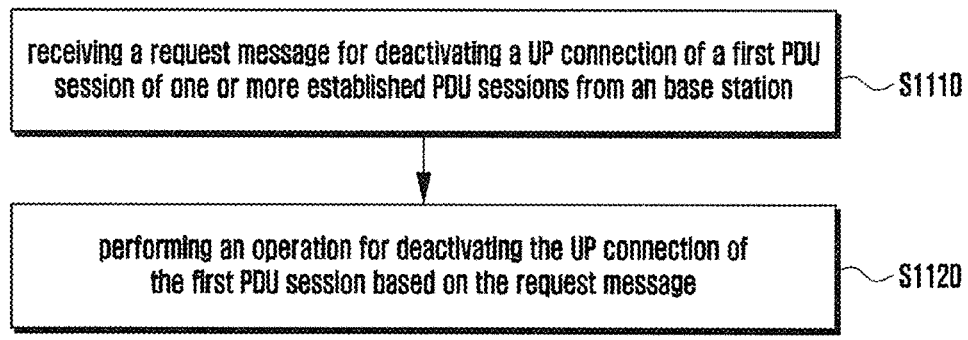
FIG. 11 illustrates a flow chart of a method of an UPF entity according to an embodiment of the disclosure.

FIG. 11. illustrates a flow chart for a method of an UPF entity according to an embodiment of the disclosure.

Referring to FIG. 11., the UPF entity receives a session modification request message for deactivating the UP connection of the first PDU session of one or more established PDU sessions from the base station (S1110). For example, a substantially same operations/procedures as described above in S120 may be applied for this.

The UPF entity performs an operation for deactivating the UP connection of the first PDU session on the basis of the session modification request message (S1120). According to an embodiment, in case that the first PDU session supports UP optimization, the UPF entity performs an operation for deactivating a downlink connection to the base station in the UP connections of the first PDU session and keeping an uplink connection. For example, a substantially same operations/procedures as described above in S120 may be applied for this.

Figure 12:
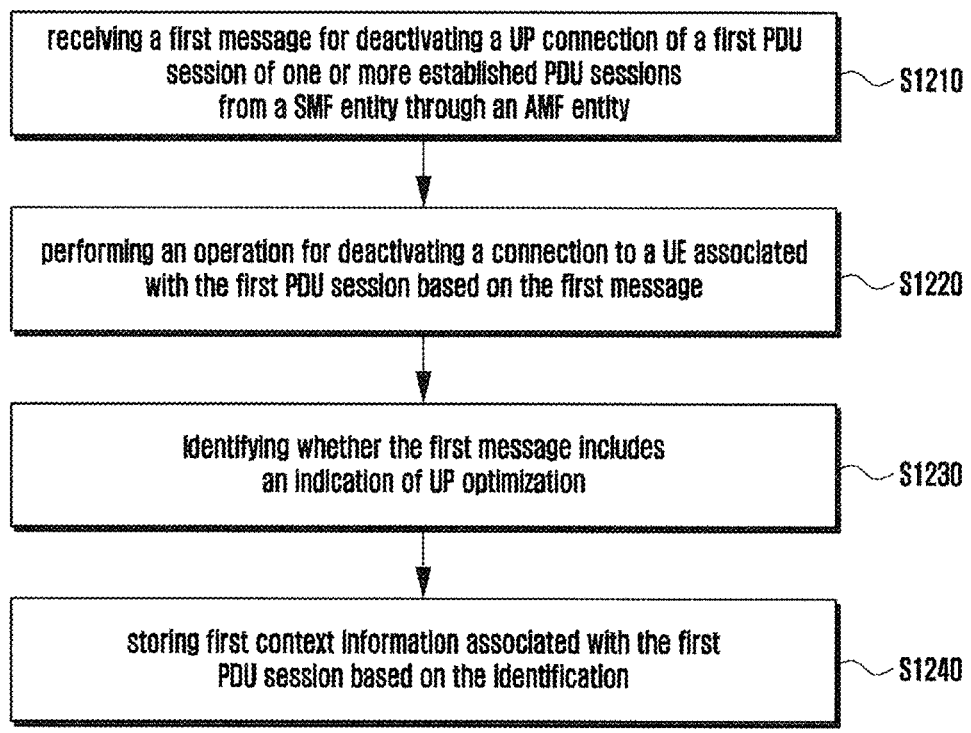
FIG. 12 illustrates a flow chart of a method of a base station according to an embodiment of the disclosure.

FIG. 12. illustrates a flow chart for a method of a base station according to an embodiment of the disclosure.

Referring to FIG. 12., the base station receives a first message (N2 resource release) for deactivating a UP connection of a first PDU session of one or more established PDU sessions from an SMF entity through an AMF entity (S1210).

The base station performs an operation (releasing radio resources) for deactivating the connection to the UE associated with the first PDU session on the basis of the first message (S1220). For example, a substantially same operations/procedures as described above in S140 may be applied for this.

The base station identifies whether the first message includes an indication of user plane (UP) optimization (S1230). For example, a substantially same operations/ procedures as described above in S140 may be applied for this.

The base station stores first content information (AS context) associated with the first PDU session on the basis of the identification (S1240). According to an embodiment, the first context information may be used to support UP optimization of the first PDU session.

According to an embodiment, the base station transmits, to the AMF entity, a connection suspend request message for suspending connections of one or more established PDU sessions, receives, from the AMF entity, a connection suspend response message in response to the connection suspend request message, suspends the connection to the UE associated with the one or more PDU sessions, stores context information including second context information (AS context) associated with the one or more PDU sessions and the first context; and transmits, to the UE, a second message including a resume ID associated with the context information. According to an embodiment, the resume ID is used to resume the connection.

According to an embodiment, the base station receives, from the UE, a connection resume request message including the resume ID in an idle mode, performs an operation for activating the connection to the UE and a connection to a UPF entity associated with the first PDU based on the context information, and transmits, to the UPF entity, uplink data received from the UE. For example, a substantially same operations/procedures as described above in FIGS. 2. and 3. may be applied for this.

Figure 13:
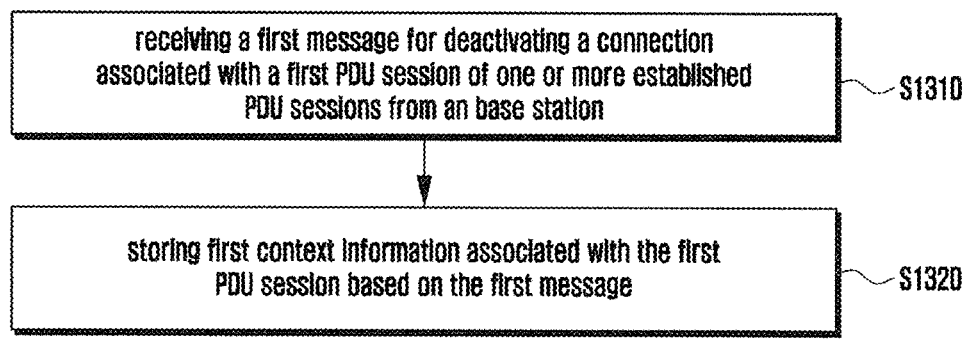
FIG. 13 illustrates another flow chart of a UE according to an embodiment of the disclosure.

FIG. 13. illustrates a flow chart for a method of a UE according to an embodiment of the disclosure.

Referring to FIG. 13., the UE (terminal) receives, from a base station, a first message for deactivating a connection associated with a first PDU session of one or more established PDU sessions (S1310). For example, a substantially same operations/procedures as described above in S150 may be applied for this.

The UE (terminal) stores first context information associated with the first PDU session based on the first message (S1320). According to an embodiment, the first context is used to support UP optimization of the first PDU session.

For example, a substantially same operations/procedures as described above in S150 may be applied for this.

According to an embodiment, the UE receives, from the base station, a second message for suspending connections associated with one or more established PDU sessions, transmits, to the base station, a connection resume request message including the resume ID in an idle mode, and transmits, to the base station, uplink data. For example, a substantially same operations/procedures as described above in FIGS. 2. and 4. may be applied for this.

According to an embodiment, the second message including a resume ID used to resume the connections, the resume ID being associated with context information including the first context information and second context information associated with the one or more PDU sessions.

According to an embodiment, the base station performs an operation for activating a connection to the UE and a connection to a UPF entity associated with the first PDU based on the context information and transmits uplink data received from the UE to the UPF entity.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, the base station and the UE may operate on the basis of a combination of parts of the embodiments of the disclosure.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) entity in a communication system, the method comprising:
performing a procedure for establishing one or more protocol data unit (PDU) sessions for user plane (UP) optimization with a user equipment (UE);
determining whether to deactivate a UP connection of a PDU session among the one or more PDU sessions based on one or more conditions for deactivating the UP connection, wherein the UP connection includes a downlink UP connection and an uplink UP connection;
in case that the UP connection is determined to be deactivated, determining whether to apply the UP optimization for the PDU session based on a condition that triggers the deactivation of the UP connection among the one or more conditions; and
transmitting, to an access and mobility management function (AMF) entity, a message for releasing a resource associated with the PDU session,
wherein, in case that the UP optimization is determined to be applied for the PDU session, the message includes an indication of the UP optimization, and
wherein the determining whether to apply the UP optimization for the PDU session comprises determining, based on the condition, whether to deactivate the downlink UP connection and the uplink UP connection or to maintain the uplink UP connection for the UP optimization.

2. The method of claim 1, wherein:
in case that the UE is identified to be out of an allowed area or a service area, the uplink UP connection and the downlink UP connection are determined to be deactivated, and
in case that an inactivity for the PDU session is identified at a user plane function (UPF) entity, the uplink UP connection is determined to be maintained for the UP optimization.

3. The method of claim 1, further comprising:
in case that the downlink UP connection and the uplink UP connection are determined to be deactivated, performing a session modification procedure with a user plane function (UPF) entity to deactivate the downlink UP connection and the uplink UP connection; and
in case that the uplink UP connection is determined to be maintained, performing a session modification procedure with the UPF entity to deactivate the downlink UP connection while maintaining the uplink UP connection.

4. The method of claim 1, wherein:
the message is transmitted via the AMF entity to a base station,
the message indicates that the base station releases the resource associated with the PDU session,
the indication of the UP optimization indicates that the base station stores context information associated with the PDU session, and
the context information includes at least one of information associated with the resource or security information.

5. A session management function (SMF) entity in a communication system, the SMF entity comprises:
a transceiver; and
at least one processor coupled with the transceiver and configured to:
perform a procedure for establishing one or more protocol data unit (PDU) sessions for user plane (UP) optimization with a user equipment (UE),
determine whether to deactivate a UP connection of a PDU session among the one or more PDU sessions based on one or more conditions for deactivating the UP connection, wherein the UP connection includes a downlink UP connection and an uplink UP connection,
in case that the UP connection is determined to be deactivated, determine whether to apply the UP optimization for the PDU session based on a condition that triggers the deactivation of the UP connection among the one or more conditions, and
transmit, to an access and mobility management function (AMF) entity, a message for releasing a resource associated with the PDU session,
wherein, in case that the UP optimization is determined to be applied for the PDU session, the message includes an indication of the UP optimization, and
wherein the at least one processor is further configured to determine, based on the condition, whether to deactivate the downlink UP connection and the uplink UP connection or to maintain the uplink UP connection for the UP optimization.

6. The SWF entity of claim 5, wherein:

in case that the UE is identified to be out of an allowed area or a service area, the uplink UP connection and the downlink UP connection are determined to be deactivated, and in case that an inactivity for the PDU session is identified at a user plane function (UPF) entity, the uplink UP connection is determined to be maintained for the UP optimization.

7. The SMF entity of claim 5, wherein the at least one processor is further configured to:

in case that the downlink UP connection and the uplink UP connection are determined to be deactivated, perform a session modification procedure with a user plane function (UPF) entity to deactivate the downlink UP connection and the uplink UP connection, and in case that the uplink UP connection is determined to be maintained, perform a session modification procedure with the UPF entity to deactivate the downlink UP connection while maintaining the uplink UP connection.

8. The SMF entity of claim 5, wherein:

the message is transmitted via the AMF entity to a base station, the message indicates that the base station releases the resource associated with the PDU session, the indication of the UP optimization indicates that the base station stores context information associated with the PDU session, and the context information includes at least one of information associated with the resource or security information.

* * * * *